US011838291B2

(12) United States Patent
Soryal (10) Patent No.: US 11,838,291 B2
(45) Date of Patent: Dec. 5, 2023

(54) DISTRIBUTED STORAGE AND USER VERIFICATION FOR VISUAL FEEDS

(71) Applicant: AT&T Intellectual Property I, L.P., Atlanta, GA (US)

(72) Inventor: Joseph Soryal, Glendale, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 85 days.

(21) Appl. No.: 17/377,012

(22) Filed: Jul. 15, 2021

(65) Prior Publication Data

US 2023/0017234 A1   Jan. 19, 2023

(51) Int. Cl.
*G06F 15/173* (2006.01)
*H04L 9/40* (2022.01)
*H04L 67/1097* (2022.01)

(52) U.S. Cl.
CPC ...... *H04L 63/0861* (2013.01); *H04L 63/0876* (2013.01); *H04L 63/105* (2013.01); *H04L 67/1097* (2013.01)

(58) Field of Classification Search
CPC ............. H04L 63/0861; H04L 63/0876; H04L 63/105; H04L 67/1097
USPC .................................. 709/225, 229; 713/186
See application file for complete search history.

(56) References Cited

U.S. PATENT DOCUMENTS 9,111,160 B1 *  8/2015  Baskaran ......... H04N 21/42204
9,990,504 B1 *  6/2018  Chapman .............. H04L 9/0643
10,169,937 B1 *  1/2019  Zwink ...................... G07C 9/23
10,205,723 B2 *  2/2019  Farrell ................ H04L 63/0428
2010/0328741 A1 * 12/2010  Cheverton ............... G03H 1/28
                                                                        359/2
2012/0214089 A1 *  8/2012  Honel ................ G11B 7/24044
                                                                        430/2
2013/0262356 A1 * 10/2013  Bonastre .............. G06K 9/6215
                                                                        706/20

(Continued)

FOREIGN PATENT DOCUMENTS

CA          3000524 A1 * 10/2019  ......... H04L 63/0861
WO    WO-2014140208 A1 *  9/2014  ............. G06F 21/74

OTHER PUBLICATIONS

Delgado-Mohatar, O., et al., "Blockchain and Biometrics: A First Look into Opportunities and Challenges", Blockchain and Applications, 2019 Intl. Congress, arXiv:1903.05496, 8 pages.

(Continued)

*Primary Examiner* — Liang Che A Wang (57) ABSTRACT

A processing system including at least one processor may obtain, from a device of a requesting entity, a request to verify an identity of a user in a visual feed, obtain the visual feed from an endpoint device associated with the user, the visual feed including first visual biometric data of the user, and extract the first visual biometric data from the visual feed. The processing system may then retrieve second visual biometric data of the user from a plurality of distributed storage nodes, each storing a portion of the second visual biometric data, determine a match between the first visual biometric data and the second visual biometric data, and transmit the visual feed to the device of the requesting entity, where the visual feed includes an indication of an authentication of the user, in response to the determining the match between the first and second visual biometric data.

20 Claims, 4 Drawing Sheets

(56) References Cited

U.S. PATENT DOCUMENTS

2019/0311148 A1* 10/2019 Andrade ................ G06F 16/84

OTHER PUBLICATIONS

Veridium, "Three Options for the Secure Storage of Biometric Data", May 31, 2018, 6 pages, accessed from htts.//www.veridiumid_com/secure-storage-for-biometric-data-essential-for-privacy/.
Veridium, "Visual Cryptography Keeps Biometrics Secure", Apr. 18, 2018, 6 pages, accessed from https://www.veridiumid.com/visual-cryptography-keeps-biometrics-secure/.

* cited by examiner

DISTRIBUTED STORAGE AND USER VERIFICATION FOR VISUAL FEEDS

The present disclosure relates generally to video communication systems, and more particularly to methods, computer-readable media, and apparatuses for transmitting a visual feed to a device of a requesting entity with an indication of an authentication of a user, in response to determining the match between first visual biometric data and second visual biometric data of the user.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one example, the present disclosure describes a method, computer-readable medium, and apparatus for transmitting a visual feed to a device of a requesting entity with an indication of an authentication of a user, in response to determining the match between first visual biometric data and second visual biometric data of the user. For example, a processing system including at least one processor may obtain, from a device of a requesting entity, a request to verify an identity of a user in a visual feed, obtain the visual feed from an endpoint device associated with the user, the visual feed including first visual biometric data of the user, and extract the first visual biometric data of the user from the visual feed. The processing system may then retrieve second visual biometric data of the user from a plurality of distributed storage nodes, wherein each distributed storage node of the plurality of distributed storage nodes stores a portion of the second visual biometric data, determine a match between the first visual biometric data and the second visual biometric data, and transmit the visual feed to the device of the requesting entity, wherein the visual feed comprises an indication of an authentication of the user, in response to the determining the match between the first visual biometric data and the second visual biometric data.

Many transactions, such as purchasing a new phone line, financial transactions, jury duty or witness appearances, notarization, or the like may typically require an in-person appearance and the verification of user identity. On the other hand, traveling restrictions and difficulties due to time, distance, cost of travel, user mobility, etc. may make such in-person appearances challenging or burdensome to achieve for many people. Examples of the present disclosure provide secure, trusted user authentication via a network-based video communication session to replicate the physical, in-person appearance of a user in connection with a transaction. In one example, the video communication session may include holographic video or similar visual representation of the user to adhere as closely as possible to an actual physical presence.

In one example, the present disclosure may include a system (broadly a "verification system") comprising a display, e.g., a projector system, at a place that requires a verified user presence (broadly a "requesting party," e.g., a party that is requesting verification of a user for a network-based video communication session), an input computing system/processing system associated with a user, such as a mobile smartphone, a wearable computing device, a desktop or laptop computer with integrated or attached camera(s), microphone(s), etc., biometric storage servers (e.g., distributed storage nodes (DSNs) where users' permanent biometric data are stored over several servers such no one server has all the biometric data of an individual), and distributed verifying nodes (DVNs) (e.g., physically distributed nodes in one or more communication networks, and/or one or more public or private clouds (virtual instances)) to verify the transactions. For instance, in one example, the verification may comprise one or more DVNs ensuring the authenticity of transmitted biometrics and recording aspects of the transaction in a distributed, replicated manner (e.g., a distributed ledger, such as a blockchain ledger).

In one example, the display of the requesting party may comprise a holographic display (e.g., a screen or projector) that is configured to present a live feed or real time feed e.g., a holographic visual feed, from the input user device. In this regard, it should be noted that the terms "live" and "real time" may mean as close to immediate/instantaneous as possible, or as reasonably practical within the capabilities and limitations of the involved devices, networks, etc. In one example, the live feed or real time feed (e.g., a visual feed and/or audio feed) may be captured as a holographic visual feed. In another example, the visual feed may be captured as a conventional 2D visual feed and converted to a 3D and/or holographic visual feed. As referred to herein, a holographic visual feed, or holographic video may have one of several forms, such as full (or partial) 3D mesh or point cloud-based volumetric video, or other holographic and/or photogrammetric techniques, such as a holographic video utilizing waveguide-based light field capture and display. In the latter case, the display of the requesting party may comprise a waveguide-based display that is capable of rendering holographic video from the data of a visual stream comprising light-field information captured by a corresponding camera associated with the user. In another example, the display of the requesting party may comprise an augmented reality (AR) and/or virtual reality (VR) headset, glasses, or the like. However, in another example, the display may comprise a 2D display screen (e.g., capable of 4K resolution, or the like) that may display visual data simulating or conveying the illusion of depth in accordance with the holographic visual feed.

In one example, the endpoint device of the requesting party, e.g., including the display/projector may comprise a memoryless device so as to not to store any received visual data or other parameters. In this regard, "memoryless" refers to the device not storing/retaining any visual data or other parameters that are received any longer than required to enable the presentation of the visual data. In other words, this does not mean that the device lacks a memory component, or components to enable typical computing operations (e.g., a random access memory (RAM), read only memory (ROM), or the like). In one example, the endpoint device of the requesting party may be certified as being memoryless, such as being certified by a trusted and reputable third party public or private certification entity.

In one example, a user may register unique biometrics that are stored in the distributed storage nodes (DSNs) by the distributed verification nodes (DVNs). When there is a transaction that requires a verified user presence, the requesting party may request the person's presence (e.g., via holographic or other visual feeds). The user device may start to transmit a live visual feed to one of the DVNs (e.g., an "active DVN"), which may process and pass the visual feed to the requesting party for presentation via the display. The active DVN may request and/or otherwise obtain stored biometric data of the user from the DSNs (e.g., visual biometric data, such as one or more fingerprints, a palm print, a retina scan/image, or the like). Notably, the visual feed may include visual biometric data of the user (e.g., of a same type, or types, as the stored visual biometric data). In one example, the active DVN may extract the visual biometric data from the visual feed and determine whether there is a match between the visual biometric data from the visual feed and the stored biometric data.

In one example, the display at the requesting party may only project the visual feed or a relevant portion thereof (e.g., a hologram of the user), if the visual biometric data from the live visual feeds and the stored visual biometric data achieve a high degree of matching (e.g., exceeding a threshold, such as a 95 percent match, a 90 percent match, an 88 percent match, etc. with respect to a number of visual features). The DVNs may comprise independent nodes to record the transactions or aspects thereof (e.g., which users and requesting parties engaged in transactions and when, the results of biometric verifications, the retrieval of pieces or portions of biometric data from DSNs, the re-storage of pieces or portions of biometric data in DSNs, time stamps, locations, Internet Protocol (IP) address, etc. associated with such transactions and/or aspects thereof, and so forth).

In one example, the user may interact with the system via a dedicated application ("app") on an endpoint device of the user. The app may have permission to access a camera and microphone of the endpoint device, and to establish a secure tunnel to stream the visual data feed from the camera (and, in one example, with the accompanying audio from the microphone) to one of the Distributed Verifying Nodes (DVN), e.g., the "active" DVN. In one example, the DVNs are connected and form a secure mesh private network. In one example, the app may encrypt the visual feed with a unique encryption key provided by the active DVN (e.g., the one that is physically closest to the user, or one that is selected according to one or more criteria, such as having a greatest spare capacity, lowest latency, etc.). In one example, the app ensures that the video/audio stream is coming from the hardware elements (camera and microphone of the device) and not a media stream that is coming from another input, such as another app or a video player running on the device. The app, while active, may scan the endpoint device and ask the user to force close other media players, browser windows, etc., so essentially the app is the only application or service to run in an active session (or the number running is minimized to only those considered essential by the operating system or device manufacturer). Thus, in one example, other non-essential applications and processes on the device are stopped and only one Internet session is held open (the one supporting access to the network-based verification system of the present disclosure). In one example, thermal imaging may be used as a secondary check to ensure that a human is actually talking. For instance, current advanced mobile phones support thermal imaging and may capture thermal image/heat images, and match the person's movement captured via optical camera with the thermal imaging. In one example, the secondary verification may be performed by the app on the user's endpoint device. Alternatively, or in addition, the thermal imaging may be streamed to the active DVN node for the secondary verification.

It should be noted that when a user first registers with a verification service provider, the user may appear in-person (physically at a designated location) so the service provider can record biometric data of the user. The service provider may then upload the biometric data to one of the distributed verification nodes, which may take each instance of biometric data (e.g., a fingerprint, a voice sample, a retina scan image, etc.), divide the instance of biometric data into several pieces or portions, and distribute the pieces or portions over multiple DSNs. Thus, if one DSN is compromised, an attacker does not gain useful, useable biometric data since the attacker may only gain possession of a single piece. To illustrate, a retina scan of the user may be recorded and divided into eight pieces, and each piece may be sent to a different DSN (e.g., randomly, semi-randomly, etc.). Similarly, a user's fingerprint may be recorded at the user's physical, in-person appearance, uploaded, and divided into X pieces (e.g., where "X" is between 2-10), each of which may be deployed over X DSNs (one piece per DSN/storage service) by one of the DVNs. In one example, information memorializing the distribution of the user's biometric data to DSNs is registered to a distributed database (e.g., a replicated database). In one example, the distributed database may comprise a distributed ledger (e.g., a blockchain) which is managed by the DVNs, e.g., each maintaining a copy of the distributed ledger.

As noted above, a requesting entity, such as a bank, may seek to verify an appearance of a user for a transaction, such as for opening a line of credit, transferring a large sum of money etc. An endpoint device of the user and/or an endpoint device of the requesting entity may connect to the verification system (or network-based verification service). As also noted above, the endpoint device of the user may stream a visual feed to the verification system. In one example, at some point during the transaction the requesting entity or enterprise (e.g., the bank) may seek to verify the identity of the user via fingerprint. In such case, the enterprise may send a request to one of the DVNs (e.g., the "active" DVN). The active DVN may have a copy of a distributed ledger (e.g., a blockchain ledger) that may contain the user information and also contains multiple hash of the pieces of each biometric data (for example, the first piece of the fingerprint, the second piece of the fingerprint, etc., the first piece of the retina scan, the second piece of the retina scan, etc., for each user).

Accordingly, in one example, the active DVN may perform a lookup within the distributed ledger records to see where the fingerprint hashes for that user (e.g., at which DSNs the pieces of the fingerprint are currently stored). The active DVN may then request the pieces of the fingerprint that match one of the hash functions stored in the distributed ledger (e.g., in a blockchain). For instance, in one example, the active DVN may give a first DSN five hashes. The first DSN may then search its stored records (e.g., the first DSN may run all the fingerprint pieces for all users through the hash algorithm and see which one(s), if any, are a match, providing any fingerprint piece(s) identified back to the DVN). Next, the active DVN may provide four hashes to a second DSN, which may try to locate a matching stored piece of the fingerprint record to one of the four hashes presented, provide any fingerprint piece(s) identified back to the DVN, and so forth for all five identified DSNs, until all of the five pieces of the fingerprint record of the user are collected at the active DVN. In this regard, each DVN may maintain a list/database of the data stored therein (e.g., pieces of different users' biometric records).

In one example, the active DVN may assemble the five pieces back into a complete fingerprint record, e.g., using computer vision algorithms and machine learning based reconstruction. In another example, each piece of the fingerprint record may be stored with an indicator of where the piece is spatially located within the complete fingerprint record, or such information may be stored into the associated distributed ledger record/entry when the piece is stored to the respective DSN. Other biometric records of the same user and of different users, such as retina scans, palm print records, voice signatures, facial imaging records, heart wave recordings, etc. may be similarly stored, retrieved, and processed. In an example in which the requesting entity seeks to verify the identity of the user via fingerprint, the stored fingerprint may be assembled as just described. In addition, the requesting entity may instruct the user to provide a current fingerprint scan via the endpoint device of the user. For instance, the user may place the finger close to a camera of the endpoint device such that fingerprint details may be recorded. Alternatively, the user may place the finger on a touchscreen of the endpoint device, which may record and transmit the image(s) of the finger as part of the visual feed, for instance the touchscreen captured fingerprint may be transmitted to the active DVN and may temporarily replace the camera-captured video in the visual stream or may be sent supplemental to the camera-captured video of the visual feed.

In any case, the active DVN may then compare the stored fingerprint record (i.e., the one reconstructed from the stored, distributed pieces) to the fingerprint scan from the user's endpoint device. The comparison may comprise determining a match between a number of visual features, such as low-level invariant image data, such as colors (e.g., RGB (red-green-blue) or CYM (cyan-yellow-magenta) raw data (luminance values) from a CCD/photo-sensor array), shapes, color moments, color histograms, edge distribution histograms, etc. Visual features may also relate to movement in a video and may include changes within images and between images in a sequence (e.g., video frames or a sequence of still image shots), such as color histogram differences or a change in color distribution, edge change ratios, standard deviation of pixel intensities, contrast, average brightness, and the like. With regard to fingerprints, the comparison may include identifying spatial features, such as the ridge and trough positions, curvatures, distinctive patterns, such as swirls, whorls, etc., scars, etc. of the stored fingerprint record, and then detecting whether the spatial features, the spatial relations between such spatial features, etc., are a match with the fingerprint image(s) received from the user's endpoint device. Similar spatial relations may comprise features used for matching a retina image to a stored retina scan, a facial image to a stored facial image, a stored eigenface of the user, etc. When there is a high degree of matching (e.g., exceeding a threshold, such as a 95 percent match with respect to the overall number of visual features, a 90 percent match, an 88 percent match, etc.), the active DVN may conclude that the user identity is confirmed (i.e., positively confirmed). As such, the DVN may notify the requesting entity in one of several ways, as described in greater detail below. In addition, after the confirmation of the user identity, the active DVN may redistribute the five pieces of the fingerprint record to different DSNs and log information regarding the distributed storage into the distributed ledger (e.g., a blockchain ledger), and similarly for other biometric data. For instance, after each usage, pieces of a retina scan may be redistributed on different DSNs, e.g., prior to the usage, retina scan piece 1 was on DSN A, retina scan piece 2 was on DSN B, etc., and after the usage piece 1 is stored to DSN C, piece 2 is stored to DSN D, etc. In one example, a new hash algorithm may be used each time the fingerprint record is used (and similarly for other biometric data).

In one example, the device of the requesting entity obtains the visual feed from the active DSN, which may encrypt the visual feed and/or the session over which the visual feed is streamed from the active DSN to the device of the requesting entity (e.g., via Transport Layer Security (TLS) or the like). The device of the requesting entity may thus decrypt the feed with a key provided by the active DSN. In one example, the active DSN may modify the visual feed to include a marking indicative that the identity of the user is verified (i.e., the user is authenticated). For instance, in one example, the DSN may insert a light cluster that contains a combination of visible, near-visible, and/or invisible light, and which may have different wavelengths and/or a moving pattern on the projected hologram.

Thus, in one example, a human personnel of the requesting entity (e.g., a member of a bank staff) may see the light cluster or other visual indicators on the hologram during the communication session to provide a positive indication of user identity. In one example, if the app on the transmitter (the user's endpoint device/client) detects a security threat, the app may notify the active DVN, which may cause the marking/light cluster to disappear. In one example, the pattern may comprise a marking that is presented at a frame rate that is undetectable to the human eye, e.g., once per 40 frames or less, once per 50 frames or less, etc. For instance, the marking may comprise a light pattern such as described above, a 2D or 3D virtual object, etc. Thus, invisible and near-visible light projection, and/or other markings undetectable to humans can be sensed by the endpoint device of the requesting entity or by another sensor device at the projection site for extra security. In one example, prior to the session, the endpoint device of the requesting entity may display the color combination or other patterns to an authorized person (e.g., a bank personnel). In addition, in one example, the active DVN may filter the retransmitted video to detect an unauthorized light cluster that matches or resembles the actual authentic light cluster. For instance, a man-in-the middle attack may inject the light cluster into the visual stream, or may replace the actual visual stream from the user's endpoint device with a fake visual stream containing a light cluster that attempts to trick the requesting entity into thinking that the user is verified and that the visual stream is authentic.

Thus, examples of the present disclosure verify that the hologram or other visual depictions of User A is the actual projection of User A, and not an impersonator, a projection injected by a man-in-the-middle attack, a "deepfake," etc. It should be noted that aspects described herein with respect to visual biometric data may similarly relate to audible biometric data, such as voice samples/user voiceprints (e.g., dividing the voiceprint into multiple pieces, distributing the pieces to different DSNs, etc.). In one example, audible biometric data may be used as a secondary verification in addition to one or more instances of visual biometric data (e.g., facial images and fingerprints, fingerprints and retina scans, etc.). In such an example, audio features that may be used to determine whether there is a sufficient degree of matching may include low-level audio features, including: spectral centroid, spectral roll-off, signal energy, mel-frequency cepstrum coefficients (MFCCs), linear predictor coefficients (LPC), line spectral frequency (LSF) coefficients, loudness coefficients, sharpness of loudness coefficients, spread of loudness coefficients, octave band signal intensities, and so forth. Such audio features may also include high-level features, such as: words and phrases. For instance, the user may be asked to speak specific words, phrases, sentences, etc. Thus, the active DVN may also ensure not only that the voice is the voice of the user, but that the user has spoken the specific word(s) instructed (e.g., as opposed to a recorded voice of the user, which is authentically of the user, but which is saying something else). In addition, in one example, each biometric record (e.g., retina scan, fingerprint record, facial image, voice signature, etc.) that is used for verification of the user identity in connection with a transaction may be processed at a separate DVN. For instance, one of the DVNs may be tasked with verifying a retina image using a stored retina scan, a different DVN may be tasked with verifying a fingerprint image using a stored fingerprint image, etc. In such case, there may be multiple "active" DVNs. However, one of the DVNs may be designated as a coordinator, which may receive confirmation from the other DVN(s) involved that the respective instances biometric data have been verified. Upon all of the instances of biometric data being verified, the coordinator DVN may then determine that the user identity is verified and may notify the device of the requesting party accordingly (e.g., via a designated light pattern inserted into the visual feed and/or other manner, such as described above, etc.). These and other aspects of the present disclosure are described in greater detail below in connection with the examples of FIGS. 1-4.

Figure 1:
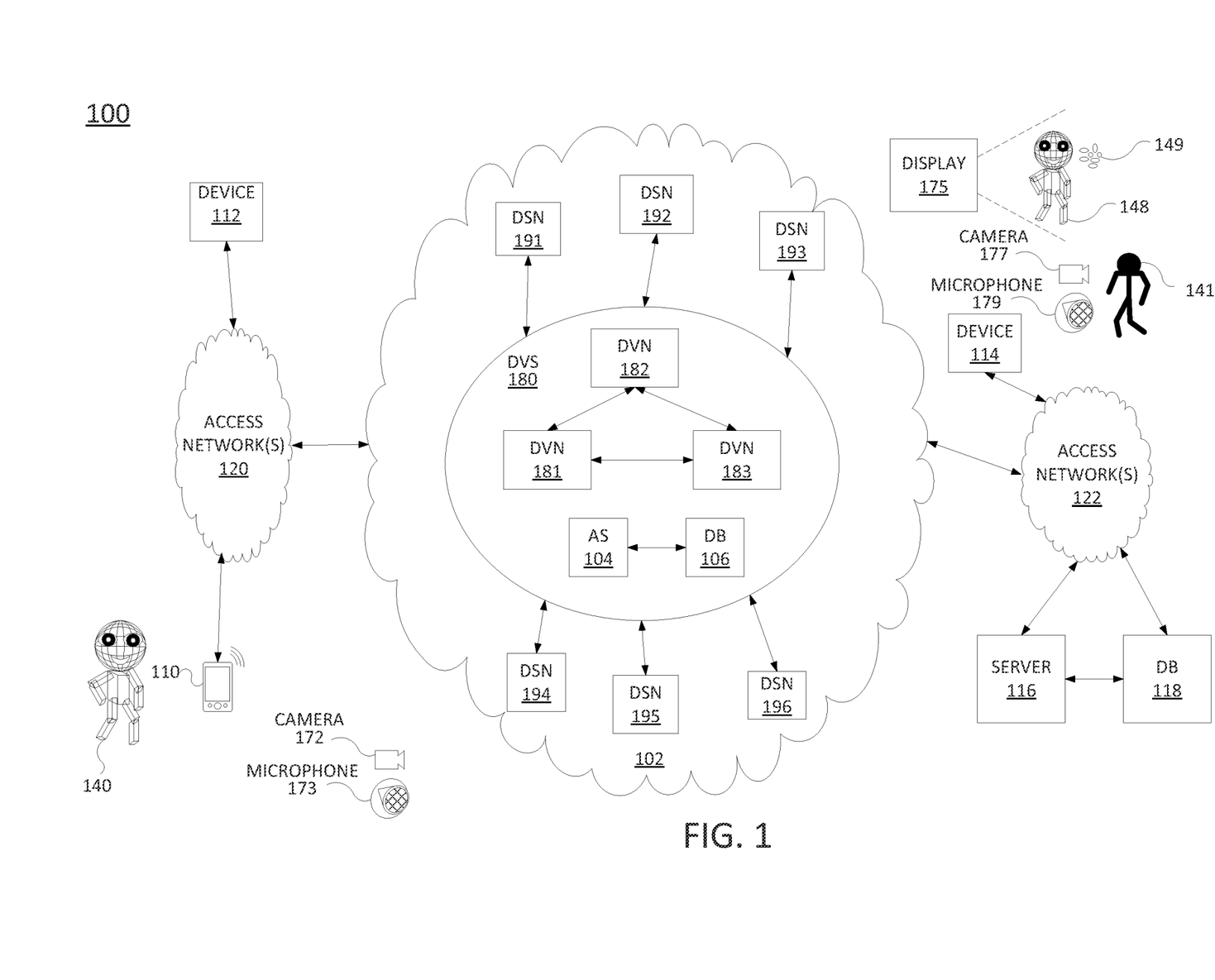
FIG. 1 illustrates an example network related to the present disclosure.

To further aid in understanding the present disclosure, FIG. 1 illustrates an example system 100 in which examples of the present disclosure may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network, a cellular network (e.g., 2G, 3G, 4G, 5G and the like), a long term evolution (LTE) network, and the like, related to the current disclosure. It should be noted that an IP network is broadly defined as a network that uses Internet Protocol to exchange data packets. Additional example IP networks include Voice over IP (VoIP) networks, Service over IP (SoIP) networks, and the like.

In one example, the system 100 may comprise a network 102 (e.g., a telecommunication network of a telecommunication service provider). The network 102 may be in communication with one or more access networks 120 and 122, and the Internet (not shown). In one example, network 102 may combine core network components of a cellular network with components of a triple play service network; where triple-play services include telephone services, Internet services and television services to subscribers. For example, network 102 may functionally comprise a fixed mobile convergence (FMC) network, e.g., an IP Multimedia Subsystem (IMS) network. In addition, network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Network 102 may further comprise a broadcast television network, e.g., a traditional cable provider network or an Internet Protocol Television (IPTV) network, as well as an Internet Service Provider (ISP) network. In one example, network 102 may include a plurality of television (TV) servers (e.g., a broadcast server, a cable head-end), a plurality of content servers, an advertising server (AS), an interactive TV/video-on-demand (VoD) server, and so forth. For ease of illustration, various additional elements of network 102 are omitted from FIG. 1.

In one example, the access networks 120 and 122 may comprise Digital Subscriber Line (DSL) networks, public switched telephone network (PSTN) access networks, broadband cable access networks, Local Area Networks (LANs), wireless access networks (e.g., an IEEE 802.11/Wi-Fi network and the like), cellular access networks, 3$^{rd}$ party networks, and the like. For example, the operator of network 102 may provide a cable television service, an IPTV service, or any other types of telecommunication service to subscribers via access networks 120 and 122. In one example, the access networks 120 and 122 may comprise different types of access networks, may comprise the same type of access network, or some access networks may be the same type of access network and other may be different types of access networks. In one example, the network 102 may be operated by a telecommunication network service provider. The network 102 and the access networks 120 and 122 may be operated by different service providers, the same service provider or a combination thereof, or may be operated by entities having core businesses that are not related to telecommunications services, e.g., corporate, governmental, or educational institution LANs, and the like.

In one example, the access network 120 may be in communication with one or more devices 110 and 112 (e.g., endpoint devices). Similarly, access network 122 may be in communication with one or more devices, e.g., device 114 (e.g., another endpoint device). The access network 122 may also be in communication with a server 116 and a database (DB) 118. Access networks 120 and 122 may transmit and receive communications between devices 110, 112, and 114, between devices 110, 112, and 114 and server 116 and/or database (DB) 118, components of the distributed verification system (DVS) 180 (e.g., distributed verification nodes (DVNs) 181-183), distributed storage nodes (DSNs) 191-196, other components of network 102, devices reachable via the Internet in general, and so forth. In one example, each of the devices 110, 112, and 114 may comprise any single device or combination of devices that may comprise an endpoint device. For example, the devices 110, 112, and 114 may each comprise a mobile device, a cellular smart phone, a laptop, a tablet computer, a desktop computer, a wearable computing device, a pair of smart glasses, an application server, an IoT device, a bank or cluster of any of the previously mentioned devices, and the like.

Figure 3:
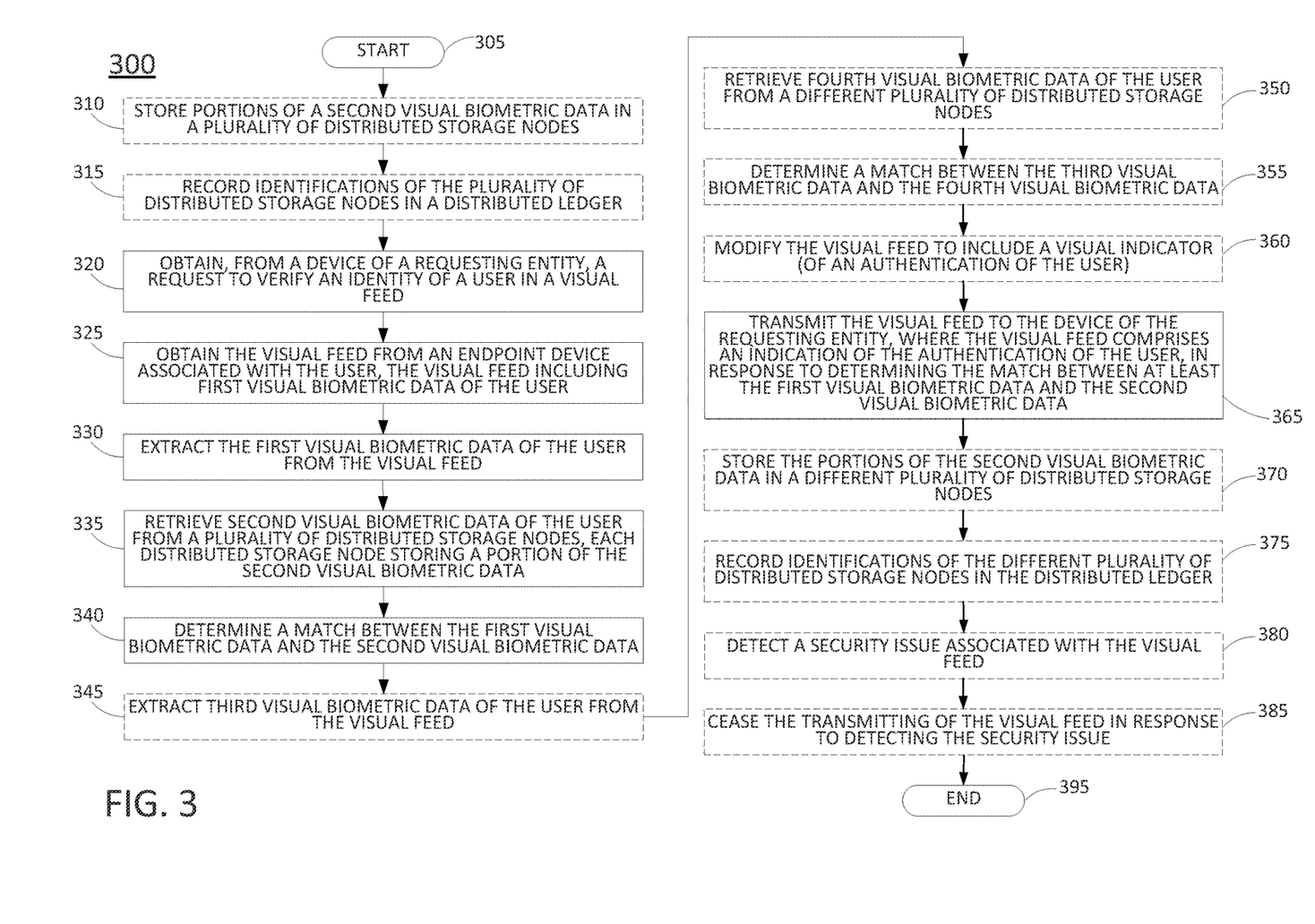
FIG. 3 illustrates a flowchart of an example method for transmitting a visual feed to a device of a requesting entity with an indication of an authentication of a user, in response to determining the match between first visual biometric data and second visual biometric data of the user.

In one example, any one or more of devices 110, 112, and 114 may each comprise programs, logic or instructions for performing operations in connection with examples of the present disclosure for transmitting a visual feed to a device of a requesting entity with an indication of an authentication of a user, in response to determining the match between first visual biometric data and second visual biometric data of the user. For example, devices 110, 112, and/or 114 may each comprise a computing system or device, such as computing system 400 depicted in FIG. 4, and may be configured to provide one or more operations or functions in connection with the example method for transmitting a visual feed to a device of a requesting entity with an indication of an authentication of a user, in response to determining the match between first visual biometric data and second visual biometric data of the user that is illustrated in FIG. 3 and discussed in greater detail below.

Figure 4:
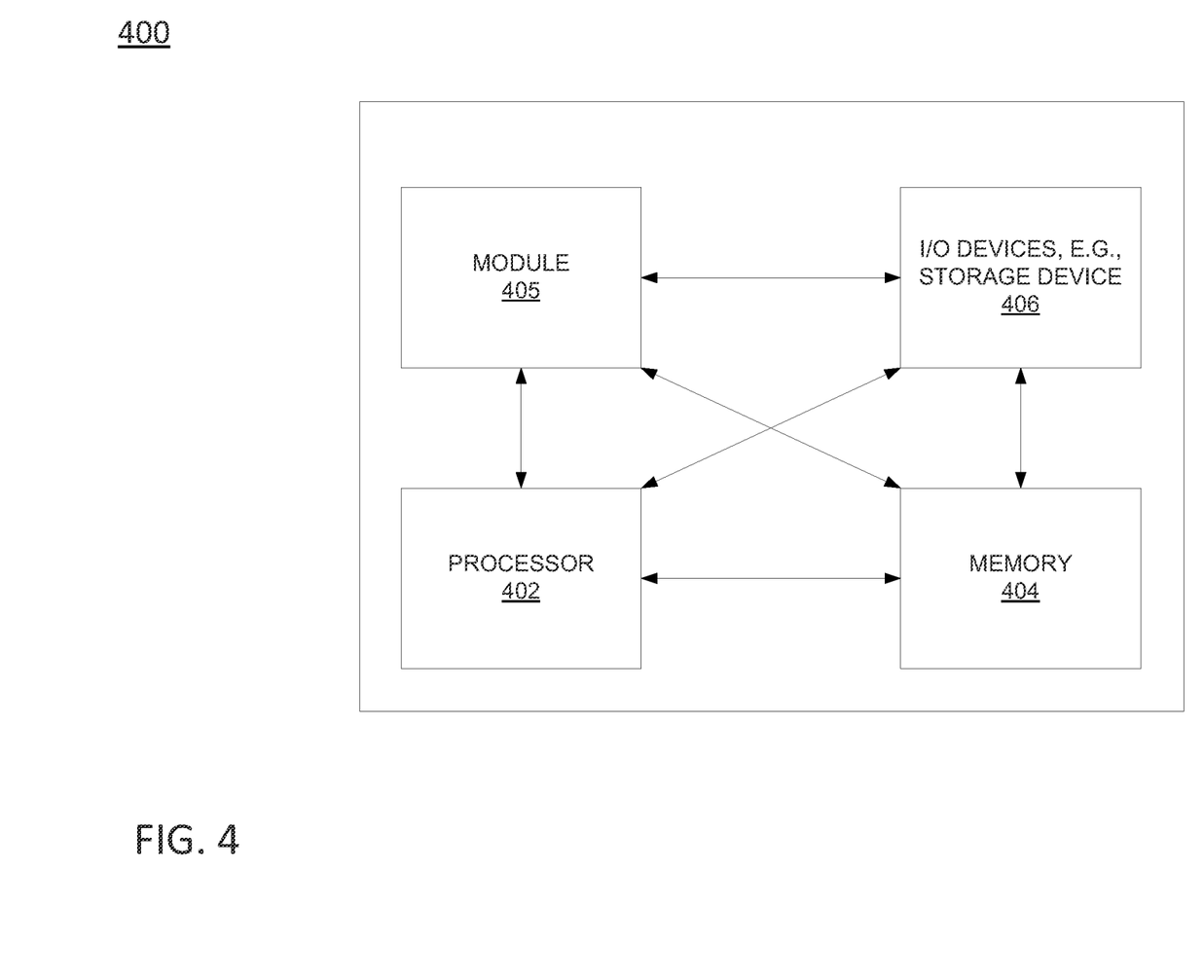
FIG. 4 illustrates a high level block diagram of a computing device specifically programmed to perform the steps, functions, blocks and/or operations described herein.

Similarly, server 116 may comprise a computing system or server, such as computing system 400 depicted in FIG. 4, and may be configured to provide one or more operations or functions for transmitting a visual feed to a device of a requesting entity with an indication of an authentication of a user, in response to determining the match between first visual biometric data and second visual biometric data of the user, as described herein. In one example, DB 118 may comprise a physical storage device integrated with server 116 (e.g., a database server), or attached or coupled to the server 116, to store various types of information. For instance, DB 118 may store basic user information, such as name, age, date of birth, username, mailing address, etc., requesting entity account information, such as authorized personnel, authorized devices, information on which users are associated with a given requesting entity, and so forth in accordance with the present disclosure.

In one example, AS 104 may comprise a network-based server for user identity verification system, etc. In this regard, AS 104 may comprise the same or similar components as those of server 116 and may provide the same or similar functions. Similarly, DB 106 may comprise the same or similar components as those of DB 118 and may provide the same or similar functions Thus, any examples described herein with respect to server 116 and/or DB 118 may similarly apply to AS 104 and/or DB 106, and vice versa. For instance, an operator of network 102 may provide a user identity verification service via AS 104 (e.g., in addition to telecommunication services such as TV, phone, internet access, etc., as described above). For instance, AS 104 may comprise a coordinator of the distributed verification nodes (DVNs) 181-183 of the distributed verification system (DVS) 180.

It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 4 and discussed below) or multiple computing devices collectively configured to perform various steps, functions, and/or operations in accordance with the present disclosure.

In an illustrative example, a user 140 may engage in a network-based transaction with an entity associated with device 114 (e.g., a bank, a governmental office, a merchant, etc., broadly, a "requesting entity"). In this case, a representative of the requesting entity, e.g., user 141, may be engaged in the transaction via device 114. In accordance with the present disclosure, the network-based transaction may require a verification/authentication of the identity of user 140. As such, the network-based transaction may be facilitated via the distributed verification system (DVS) 180. For instance, user 141, via device 114 may communicate with AS 104, indicating a request to verify the identity of user 140 via a visual feed from device 110. In another example, the request may be initiated via device 110. In one example, device 110 and device 114 may already have an established communication session via one or more networks (e.g., access network(s) 120, access network(s) 122, network 102, etc.). In such case, separate session(s) may be established with DVS 180, or the session may be transferred to two connections to the DVS 180. However, in another example, all interactions between device 110 and device 114 may flow via DVS 180 (e.g., via at least one of DVNs 181-183). In one example, the request to verify the identity of the user 140 may include a request to verify a particular type of biometric data, e.g., visual biometric data, such as a fingerprint, palm print, retina scan, etc. In one example, the verification task may be assigned to one of the DVNs 181-183.

As illustrated in FIG. 1, device 110 may include at least a camera 172 and a microphone 173. The camera 172 may comprise, for example, a camera capable of detecting and recording object depth information (e.g., a "RGB-D" camera), a waveguide-based light field capture camera, etc. In any case, the device 110 may capture visual data from camera 172 (and audio from microphone 173) and stream the captured data as a visual feed to the assigned one of DVN(s) 181-183. For illustrative purposes, it may be assumed that DVN 181 is assigned the task of verifying the identity of user 140 via retina scan. In one example, a secure tunnel is established between device 110 and DVN 181 for the purpose of uploading the visual feed and for communicating other data in connection with the network-based transaction. Similarly, a secure tunnel may be established between device 114 and DVN 181 for the DVN 181 to transmit the visual feed to device 114, and for communicating other data in connection with the network-based transaction.

As illustrated in FIG. 1, device 114 may include at least a camera 177, a microphone 179, and a display 175. The display 175 may comprise a holographic projector, an AR or VR headset, a waveguide-based display that is capable of rendering holographic video from the data of a visual feed/stream comprising light-field information captured by camera 172, or the like, and so forth. In another example, the display may comprise a 2D display screen (e.g., capable of 4K resolution, or the like) that may display visual data simulating or conveying the illusion of depth in accordance with the visual feed. In one example, camera 177 may be the same or similar to camera 172. However, in another example camera 177 may not necessarily have the same capabilities as camera 172. For instance, since it is not necessary to verify the identity of user 141 and since user 140 may not possess a display device capable of displaying/rendering holographic video (or at least not at a sufficiently high visual quality), a visual stream from device 114 may be a conventional 2D video stream. In this regard, it should also be noted that in one example, a visual feed from device 114 may be streamed to DVN 181 and passed to device 110 by DVN 181. However, in another example, a separate stream may be established for conveying the visual feed from device 114 to device 110, e.g., without the involvement of DVN 181 or other components of DVS 180.

In one example, a two-way video communication session may be commenced between device 110 and device 114 via DVN 181 (e.g., without the verification of the identity of the user 140). However, at some point during the transaction (e.g., during the video communication session), the user 141 may seek to verify the identity of user 140. For instance, user 141 may instruct user 140 to provide a retina image by placing an eye of the user 140 close to camera 172. In one example, user 141, via device 114, may notify DVN 181 that the verification should be taking place at such time. As such, DVN 181 may receive the visual feed from device 110 and may look for one or more retina images. For instance, this may comprise a low-level pattern matching to distinguish between wider views of user 140 versus close-ups (which are expected to be one or more retina images).

In addition, DVN 181 may retrieve a stored retina image/ retina scan from several of DSNs 191-196. For instance, user 140 may previously have appeared physically in-person to provide one or more types of biometric data, which may be uploaded to AS 104, and divided and distributed in multiple pieces to a plurality of the DSNs 191-196. For example, user 140 may have allowed a retina image/retina scan to be captured and uploaded to AS 104. AS 104 may then have divided the retina scan into several pieces and distributed the pieces to different DSNs 191-196. In addition, in one example, AS 104 may record the storing of the pieces to different DSNs 191-196 in a distributed ledger, e.g., a blockchain ledger maintained by DVNs 181-183. Alternatively, AS 104 may provide the retina scan to one of DVNs 181-183, which may be tasked with dividing and distributing the pieces of the retain scan to different ones of the DSNs 191-196, and recording details to the distribution of pieces to the distributed ledger. In one example, the DVNs 181-183 remain in communication with each other via a secure mesh network for updating records in the replicated, distributed ledger.

Thus, for example, DVN 181 may obtain pieces of the stored retina scan by performing a look-up via the replicated, distributed ledger to identify which DSNs contain the pieces of the retina scan, and requesting the pieces from the respective DSNs. In one example, this may include providing hash keys to the respective DSNs, which may identify relevant records matching the hash keys and provide the records in response (e.g., comprising the pieces of the retina scan). Accordingly, DVN 181 may reassemble the pieces of the stored retina scan, and determine whether the stored retina scan matches the retina image/retina scan from the visual feed obtained from device 110, e.g., determining a degree of matching, and whether the degree of matching exceeds a threshold, or the like.

As noted above, when there is a match, DVN 181 may determine that the identity of user 140 is verified. In addition, DVN 181 may provide an indication to device 114 of the (positive) verification of the identity of user 140, which may comprise DVN 181 modifying the visual stream from device 110 to include a designated marking, such as a light pattern as described above, a 2D or 3D virtual object, an invisible or near-visible light projection, or the like, and then passing the visual stream (as modified) to device 114. As such, device 114 may render a projection 148 of user 140 via display 175 in accordance with the visual stream received from DVN 181. In addition, when the identity of user 140 is verified, the display 175 may also present the marking 149 contained within the visual feed that may be received from DVN 181. In one example, the marking/designated pattern 149 may be forwarded to device 114 and/or to user 141 via device 114 in advance of the verification process such that the device 114 and/or user 141 may determine that the identity of user 140 has been verified, for instance, such that the transaction may be allowed to continue, to be completed, etc.

After using the stored retina scan in connection with verification of user 140, DVN 181 may re-store pieces of the retina scan to DSNs 191-196. In one example, DVN 181 may select different ones of DSNs 191-196 to receive and store the respective pieces (e.g., randomly, semi-randomly, etc.). In one example, the pieces may be identical to those obtained for the verification. In another example, DVN 181 may dynamically segregate the retina scan differently such that the new pieces are not the same as the previous pieces, e.g., changing boundary line positions, orientations, the sizes of the pieces (which may not necessarily be uniform), the number of pieces (which may change to comprise more or less pieces), etc. In addition, DVN 181 may record information noting the storage of the pieces to the respective DSNs, e.g., to the distributed data storage, such as a blockchain ledger maintained by DVNs 181-183.

It should be noted that in one example, device 112 may also comprise a device of an attacker who has an intent in gaining unauthorized access to the visual communication session between device 110 and device 114. For instance, device 112 may come to possess security keys for the secure tunnel between device 110 and DVN 181, e.g., device 112 may have previously compromised device 110 and may have remote access and control of certain components thereof, e.g., such that device 112 can replace video and audio from camera 172 and microphone 173 with a visual stream (e.g., including audio) of its own selection (such as a "deepfake" comprising a likeness of user 140). Accordingly, in one example, device 114 may re-request authentication/verification of the identity of user 140 via the same or additional types of biometric data (e.g., via another retina image captured via camera 172 of device 110 at a later time, via a fingerprint, etc.). The additional and/or ongoing biometric authentication may be performed by the same or a different DVN. In the event that the authentication/verification of user 140 fails, DVN 181 may cease to insert the marking 149 into the visual stream. Thus, device 114 and/or user 141 may be notified that the communication session and the transaction may be compromised and should be aborted.

Similarly, in the event that either of users 140 or 141, and/or device 110 or device 114 detects that the security of the communication session or other aspects of the transaction may be compromised, a notification may be sent to DVN 181, which may cease to insert the marking 149 into the visual feed, may add a different marking affirmatively indicating a potential problem, etc. For instance, an app on device 110 used in connection with the present identity verification system may monitor device 110 to ensure that other applications and services are closed, there are no browser windows open, etc. Thus, for example, if user 140 opens a video player to stream Internet video, while there may be no malicious intent by user 140, the app on device 110 may be configured to treat such a detected event to be an unacceptable security risk and may notify DVN 181 accordingly.

It should be noted that the foregoing describes just one illustrative example of how the system 100 may be used in connection with examples of the present disclosure for transmitting a visual feed to a device of a requesting entity with an indication of an authentication of a user, in response to determining the match between first visual biometric data and second visual biometric data of the user. Thus, for instance, in another example, device 110, DVN 181, or other components may protect user privacy by obscuring other aspects of the visual feed that are not relevant to authenticating user 140 and providing a realistic representation of user 140 for completing a transaction. In one example, the request to verify the identity of the user 140 may include a request to verify a plurality of types of biometric data. In one example, two or more of the DVNs 181-183 may be assigned, e.g., one for each type of biometric data. However, in such case, one of the DVNs 181-183 may be designated as a coordinator, e.g., to receive and transmit/forward the visual feed from device 110 to device 114, to insert a marking indicating positive authentication/verification, etc. For instance, DVN 181 may provide a portion of the visual feed to DVN 182, which DVN 182 may use to verify user 140 via fingerprint matching. DVN 182 may respond to DVN 181 with a positive confirmation (or negative indication if there is not a match, e.g., not a sufficient level/degree of matching). In another example, AS 104 may receive and forward the visual stream from device 110 to device 114, while biometric authentication is delegated to one or more of the DVNs 181-183. Thus, DVNs 181-183 may receive selected portions of the visual feed from device 110 to use for authentication, while the video streaming from device 110 to device 114 is handled by a different designated component of DVS 180. In still another example, steps, functions, and/or operations performed by DVNs 181-183 may alternatively or additionally be performed by AS 104 or server 116, and vice versa. Similarly, although the foregoing examples relate to visual biometric data, it should be understood that authentication of user 140 may alternatively or additionally be based on audible data, e.g., a voice signature, or the like. Thus, these and other illustrative uses of the system 100 may be provided in accordance with the present disclosure.

It should also be noted that the system 100 has been simplified. Thus, the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, a content distribution network (CDN) and the like. For example, portions of network 102 and/or access networks 120 and 122 may comprise a content distribution network (CDN) having ingest servers, edge servers, and the like, for packet-based streaming of videos or video segments that may be provided in accordance with the present disclosure. Similarly, although only two access networks 120 and 122 are shown, in other examples, access networks 120 and/or 122 may each comprise a plurality of different access networks that may interface with network 102 independently or in a chained manner. For example, device 114 and server 116 may access network 102 via different access networks, devices 110 and 112 may access network 102 via different access networks, and so forth. Thus, these and other modifications are all contemplated within the scope of the present disclosure.

Figure 2:
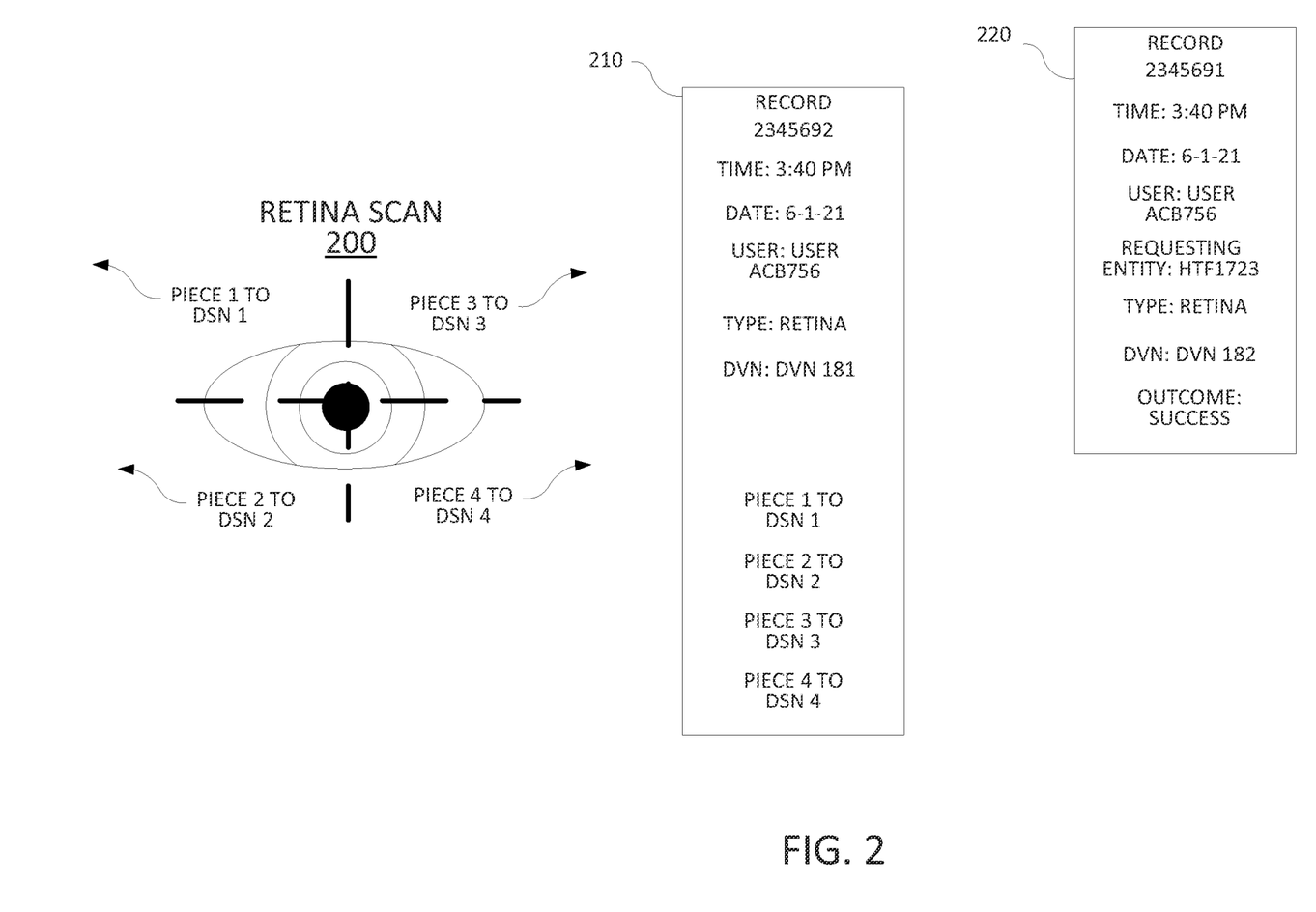
FIG. 2 illustrates an example of distributed storage of pieces of an instance of biometric data and example distributed ledger records, in accordance with the present disclosure.

To further illustrate aspects of the present disclosure, FIG. 2 depicts an example of processing a retina scan 200 and associated distributed ledger records/entries 210 and 220.

For instance, retina scan 200 of FIG. 2 may be obtained from a user via a physical in-person appearance for an entity with which the user may engage in one or more transactions that require user identity verification/authentication. For instance, the retina scan 200 may be captured by a camera of the entity, or may be captured by a trusted third-party that may provide user verification on behalf of the entity. As described above, each instance of biometric data of a user may be divided into pieces and assigned to several distributed storage nodes (DSN) (e.g., one for each piece). Thus, in the example of FIG. 2, piece 1 of the retina scan 200 may be assigned to DSN 1, piece 2 may be assigned to DSN 2, piece 3 may be assigned to DSN 3, and piece 4 may be assigned to DSN 4. It should again be noted that the number of pieces is merely illustrative in nature. Thus, it should be appreciated that in other, further, and different examples, more or less pieces may be generated from an instance of biometric data (such as retina scan 200). In one example, the distribution of the pieces to the respective DSNs may be performed by one of a plurality of distributed verification nodes (DVNs), each maintaining a copy of a shared and replicated distributed ledger (e.g., a blockchain ledger).

In this regard, FIG. 2 illustrates an example distributed ledger record 210, e.g., a blockchain record, which may record information pertaining to the storage of the pieces of the retina scan 200 to DSNs 1-4. For instance, distributed ledger record 210 includes a date and time (e.g., identifying when the pieces 1-4 were distributed to the respective DSNs 1-4), an identifier of the user, the type of biometric data, the DVN that performed the distribution of the pieces 1-4 to the DSNs 1-4 (e.g., DVN 181), and information identifying which pieces were distributed to which DSNs. In one example, the record 210 may store hash values which are associated with the respective pieces, and identifiers of the DSNs to which the pieces 1-4 are distributed, but may not specifically identify which pieces are distributed to which DSNs. For instance, this may allow the pieces to be retrieved by performing at most four hash look-ups at each of the DSNs 1-4, while making an attack more difficult.

Notably, when the retina scan 200 may be used to verify the user via matching to a current retina image obtained from a visual feed from a device of the user, a distributed verification node (DVN) tasked with performing the verification/authentication may scan its distributed ledger records for a most current record relating to the user (e.g., user ACB756) and the instance of biometric data (e.g., the retina scan 200). As such, the DVN may retrieve the pieces from the respective DSNs. As further illustrated in FIG. 2, example distributed ledger record 220, e.g., a blockchain record, stores information regarding the verification/authentication task performed by a DVN. For instance, DVN 182 may retrieve the retina scan of user ACB756 at 3:40 PM on 6-1-21. The retrieval may be performed upon the request from entity HTF1723 (which may comprise a bank, a merchant, etc.) to verify the identity of user ACB756 via retina scan. For example, DVN 182 may scan the distributed ledger to find distributed ledger record 210 being the most recent record relating to the retina scan of user ACB756. DVN 182 may then request the pieces 1-4 of the retina scan from DSNs 1-4 in accordance with the information stored in the distributed ledger record 210, and reassemble the pieces into the complete retina scan. In addition, DVN 182 may obtain a current retina scan/image from a device of user ACB756, from which DVN 182 may calculate a degree/level of matching between the stored retina scan that is reassembled from pieces 1-4 and the current retina scan/image obtained from the device of user ACB756. Accordingly, the distributed ledger record 220 may also indicate the outcome of the verification, in this case: "success" e.g., a successful match was determined and the user is verified.

It should be noted that after the verification, DVN 182 may re-store pieces of the retina scan of user ACB756 to DSNs. However, the storage may be to a different combination of DSNs. In addition, DVN 182 may create a new distributed ledger record, similar to distributed ledger record 210, indicating the current storage locations of the pieces of the retina scan of user ACB756. It should also be noted that the examples of FIG. 2 are for illustrative purposes, and that the distributed ledger records may have other, further, and different forms in accordance with the present disclosure. For instance, in one example, distributed ledger records 210 and 220 may include more or less fields. In another example, distributed ledger record 210 may be separated into multiple records, e.g., one per piece of the retina scan. Thus, these and other modifications are all contemplated within the scope of the present disclosure.

FIG. 3 illustrates a flowchart of an example method 300 for transmitting a visual feed to a device of a requesting entity with an indication of an authentication of a user, in response to determining the match between first visual biometric data and second visual biometric data of the user, in accordance with the present disclosure. In one example, the method 300 is performed by a component of the system 100 of FIG. 1, such as by one of DVNs 181-183, the server 116, application server 104, and/or any one or more components thereof (e.g., a processor, or processors, performing operations stored in and loaded from a memory), by a plurality of the DVNs 181-183, server 116, application server 104, or by any one or more of such devices in conjunction with one or more other devices, such as DB 106, DB 118, etc. For instance, the method 300 is performed by a distributed verification system, e.g., DVS 180 of FIG. 1 and/or any one or more components thereof. In one example, the steps, functions, or operations of method 300 may be performed by a computing device or system 400, and/or processor 402 as described in connection with FIG. 4 below. For instance, the computing device or system 400 may represent any one or more components of a device, server, and/or application server in FIG. 1 that is/are configured to perform the steps, functions and/or operations of the method 300. Similarly, in one example, the steps, functions, or operations of method 300 may be performed by a processing system comprising one or more computing devices collectively configured to perform various steps, functions, and/or operations of the method 300. For instance, multiple instances of the computing device or processing system 400 may collectively function as a processing system. For illustrative purposes, the method 300 is described in greater detail below in connection with an example performed by a processing system. The method 300 begins in step 305 and may proceed to optional step 310 or to step 320.

At optional step 310, the processing system may store portions of (e.g., a second) visual biometric data of a user in a plurality of distributed storage nodes. For instance, the user may appear in-person (physically at a designated location) so that a service provider can record biometric data of the user and upload the biometric data to the processing system (e.g., to a distributed verification node), which may take each instance of biometric data (e.g., a fingerprint, a voice sample, a retina scan image, etc.), divide the instance of biometric data into several pieces, and distribute the pieces over multiple distributed storage nodes (DSNs).

At optional step 315, the processing system may record identifications of the plurality of distributed storage nodes in a distributed ledger, e.g., of a blockchain. For instance, optional step 315 may comprise adding a record to the distributed ledger, such as the example distributed storage record 210 of FIG. 2.

At step 320, the processing system obtains, from a device of a requesting entity, a request to verify an identity of a user in a visual feed.

At step 325, the processing system obtains the visual feed from an endpoint device associated with the user, the visual feed including first visual biometric data of the user. In one example, the visual feed may comprise a holographic video, which may have one of several forms, such as a full (or partial) 3D mesh or point cloud-based volumetric video, a holographic video utilizing waveguide-based light field capture and display, or other holographic and/or photogrammetric techniques. At step 330, the processing system extracts the first visual biometric data of the user from the visual feed.

At step 335, the processing system retrieves second visual biometric data of the user from a plurality of distributed storage nodes, where each distributed storage node of the plurality of distributed storage nodes stores a portion of the second visual biometric data. Accordingly, an entirety of the second visual biometric data is stored within the plurality of distributed storage nodes. In one example, the first visual biometric data may comprise a first retina image of the user, and the second visual biometric data may comprise a second retina image of the user (e.g., stored in accordance with optional steps 310 and 315). In another example, the first visual biometric data may comprise a first fingerprint image of the user, and the second visual biometric data may comprise a second fingerprint image of the user (e.g., stored in accordance with optional steps 310 and 315).

In one example, step 335 may comprise accessing a distributed ledger (e.g., of a blockchain) that stores identifications of the plurality of distributed storage nodes storing portions of the second visual biometric data. For instance, in one example, the processing system may comprise one of a plurality of distributed verification nodes, each maintaining a copy of the distributed ledger. In one example, the plurality of distributed verification nodes may comprise blockchain nodes. In one example, the distributed ledger is associated with a blockchain that is dedicated to the requesting entity, where other requesting entities may have respective dedicated blockchains for verifying authenticities of users. Thus, in one example, the stored biometrics of users may be maintained on a per-requesting entity basis. In other words, if a user has relationship with two banks, each bank may have separately stored biometrics for the user.

Accordingly, the storage locations of pieces of the biometric data, the retrieval and re-storage, etc. may be separately record in the two different blockchains.

At step 340, the processing system determines a match between the first visual biometric data and the second visual biometric data (e.g., when there is a high degree/level of matching, such as exceeding a threshold). For example, step 340 may comprise determining matches between a number of visual features, such as low-level invariant image data, features relating to movement in a video, changes within images and/or between images in a sequence, spatial features, and so forth. When there is a high degree of matching (e.g., exceeding a threshold, such as a 95 percent match with respect to the overall number of visual features, a 90 percent match, an 88 percent match, etc.), the processing system may conclude that the user identity is confirmed (i.e., positively confirmed) or at least that there is a (positive) match between the first visual biometric data and the second visual biometric data.

At optional step 345, the processing system may extract third biometric data (e.g., visual and/or audio biometric data) of the user from the visual feed. In one example, the extracting of the third biometric data of the user from the visual feed is performed via at least a second distributed verification node (e.g., where at least steps 330-340 may be performed via a first distributed verification node, and where, in one example, the processing system may comprise the first distributed verification node).

At optional step 350, the processing system may retrieve fourth biometric data (e.g., visual and/or audio biometric data) of the user from a different plurality of distributed storage nodes. For instance, each distributed storage note of the plurality of different distributed storage nodes may store a portion of the fourth biometric data. Accordingly, an entirety of the fourth biometric data may be stored within the different plurality of distributed storage nodes.

At optional step 355, the processing system may determine a match between the third biometric data (e.g., visual and/or audio biometric data) and the fourth biometric data (e.g., visual and/or audio biometric data). In one example, optional steps 350 and 355 may be performed via at least the second distributed verification node. For instance, When there is a high degree of matching (e.g., exceeding a threshold, such as a 95 percent match with respect to the overall number of visual features, a 90 percent match, an 88 percent match, etc.), the processing system may conclude that the user identity is confirmed (i.e., positively confirmed), or at least that there is a (positive) match between the third biometric data and the fourth biometric data.

At optional step 360, the processing system may modify the visual feed to include an indication of an authentication of the user, e.g., the indication comprising a visual indicator. The visual indicator may comprise, for example, a changing pattern comprising at least two colors, e.g., a light cluster that contains a combination of visible, near-visible, and/or invisible light, and which may have different wavelengths and/or a moving pattern on the projected hologram, or may comprise a marking that is presented at a frame rate that is undetectable to the human eye, or a 2D or 3D virtual object that is made known to a computing device of the requesting entity to signal a positive user verification. For instance, the processing system may modify the visual feed to include an indication of the authentication of the user (e.g., an indication of the (e.g., positive) verification of the authentication of the user as a result of the determination of the match at step 340, and in one example, additionally in response to determining the match at optional step 355). In one example, the identity of the user may be verified (e.g., positively) based upon an overall level of matching with respect to step 340 and optional step 355 (e.g., an average of the levels/ degrees of matching from step 340 and optional step 355, a weighted average, etc.).

At step 365, the processing system transmits the visual feed to the device of the requesting entity, where the visual feed comprises an indication of the authentication of the user, in response to determining the match between the first visual biometric data and the second visual biometric data (and in one example, additionally in response to determining the match between the third visual biometric data and the fourth visual biometric data at optional step 355).

At optional step 370, the processing system may store the portions of the second visual biometric data in a different plurality of distributed storage nodes.

At optional step 375, the processing system may record identifications of the different plurality of distributed storage nodes in the distributed ledger. For instance, optional steps 370 and 375 may be the same or similar to optional steps 310 and 315 discussed above.

At optional step 380, the processing system may detect a security issue associated with the visual feed. In one example, the security issue may be detected via a notification to the processing system from the endpoint device of the user. For instance, the endpoint device of the user may include a trusted application for providing the visual feed and that is configured to close all other non-essential applications and services on the endpoint device, e.g., that are not associated with or needed for supporting the transmitting of the visual feed. Thus, for example, if the application detects that a browser window is opened, a remote connection is attempted by the browser or another application, etc., the endpoint device of the user may alert the processing system if such browser window is not needed in supporting the current verification process.

At optional step 385, the processing system may cease the transmitting of the visual feed in response to detecting the security issue. For instance, the processing system may continue the transmitting of the visual feed on an ongoing basis until the transaction ends (e.g., until the visual feed is ended by the device of the requesting entity or the device of the user), or until the security issue is detected. It should be noted that in another example, when a security issue is detected, the processing system may continue to transmit the visual feed, but a visual indicator of the authentication of the user may be omitted, or another visual indicator may be added to the visual feed providing an affirmative indication that a security issue has been detected (and that the requesting entity may wish to end the transaction, to not complete the transaction, etc.).

At step 395 the method 300 ends.

It should be noted that the method 300 may be expanded to include additional steps, or may be modified to replace steps with different steps, to combine steps, to omit steps, to perform steps in a different order, and so forth. For instance, in one example the processing system may repeat one or more steps of the method 300 during the course of a transaction between the requesting entity and the user. For example, the user may be requested to re-verify identity at one or more additional times during the transaction (e.g., while the visual feed is ongoing) by providing one or more additional retina images, fingerprint images, or the like, and so on. In one example, the method 300 may include an additional level of user verification via obtaining audio features representing the voice of the user from the visual feed (e.g., from an audio component/track of the visual feed) and matching to a stored voice signature of the user, which may also be stored piecewise in a distributed manner in a plurality of distributed storage nodes). In another example, the method 300 may be modified to transmit an audio feed and/or a visual feed to a device of a requesting entity with an indication of an authentication of a user, in response to determining a match between first audio biometric data and second audio biometric data of the user (e.g., without authentication using visual biometric data and/or where audio biometric data is used as a primary authentication factor and visual biometric data is used as a secondary authentication factor). For instance, step 320 may comprise obtaining, from a device of a requesting entity, a request to verify an identity of a user in an audio feed (which in one example, may comprise an audio-only live feed). In one example, the indication of the authentication may be a particular audio pattern or sound, which in one example, may be detected by the device of the requesting entity and/or which may be a human perceptible sound/audio pattern. In another example, the method 300 may include obtaining a command, indication, or request from the device of the requesting entity indicating a time in which the visual feed is to include visual biometric data of the user. For example, a representative of the requesting entity may instruct the user (e.g., verbally) to place an eye close to a camera of the device of the user to allow a retina image to be captured. The representative may also provide a notification to the processing system that the next 5 seconds, the next 10 seconds, etc. of the visual feed should include the retina image. In one example, the notification may be a voice command or signal that is spoken and obtained by the processing system from a corresponding visual feed from the device of the requesting entity and which can be detected via an audio detection model for identify the particular voice command(s)/instruction(s). Thus, these and other modifications are all contemplated within the scope of the present disclosure.

In addition, although not expressly specified above, one or more steps of the method 300 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 3 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the example embodiments of the present disclosure.

FIG. 4 depicts a high-level block diagram of a computing device or processing system specifically programmed to perform the functions described herein. For example, any one or more components or devices illustrated in FIG. 1 or described in connection with FIG. 2 or the example method 300 of FIG. 3 may be implemented as the processing system 400. As depicted in FIG. 4, the processing system 400 comprises one or more hardware processor elements 402 (e.g., a microprocessor, a central processing unit (CPU) and the like), a memory 404, (e.g., random access memory (RAM), read only memory (ROM), a disk drive, an optical drive, a magnetic drive, and/or a Universal Serial Bus (USB) drive), a module 405 for transmitting a visual feed to a device of a requesting entity with an indication of an authentication of a user, in response to determining the match between first visual biometric data and second visual biometric data of the user, and various input/output devices 406, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one processor element is shown, it should be noted that the computing device may employ a plurality of processor elements. Furthermore, although only one computing device is shown in the Figure, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of this Figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 402 can also be configured or programmed to cause other devices to perform one or more operations as discussed above. In other words, the hardware processor 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 405 for transmitting a visual feed to a device of a requesting entity with an indication of an authentication of a user, in response to determining the match between first visual biometric data and second visual biometric data of the user (e.g., a software program comprising computer-executable instructions) can be loaded into memory 404 and executed by hardware processor element 402 to implement the steps, functions or operations as discussed above in connection with the example method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for transmitting a visual feed to a device of a requesting entity with an indication of an authentication of a user, in response to determining the match between first visual biometric data and second visual biometric data of the user (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method comprising:
obtaining, by a processing system including at least one processor, from a device of a requesting entity, a request to verify an identity of a user in a visual feed;
obtaining, by the processing system, the visual feed from an endpoint device associated with the user, the visual feed including first visual biometric data of the user, wherein the endpoint device associated with the user includes a trusted application for providing the visual feed and the trusted application is configured to close other applications and services on the endpoint device, wherein the other applications and services are not associated with transmitting of the visual feed;
extracting, by the processing system, the first visual biometric data of the user from the visual feed;
retrieving, by the processing system, second visual biometric data of the user from a plurality of distributed storage nodes, wherein each distributed storage node of the plurality of distributed storage nodes stores a portion of the second visual biometric data;
determining, by the processing system, a match between the first visual biometric data and the second visual biometric data; and
transmitting, by the processing system, the visual feed to the device of the requesting entity, wherein the visual feed comprises an indication of an authentication of the user, in response to the determining the match between the first visual biometric data and the second visual biometric data.

2. The method of claim 1, wherein the indication of the authentication of the user comprises a visual indicator, wherein the method further comprises:
modifying the visual feed to include the visual indicator.

3. The method of claim 2, wherein the visual indicator comprises a changing pattern comprising at least two colors.

4. The method of claim 1, wherein the first visual biometric data comprises a first retina image of the user, and wherein the second visual biometric data comprises a second retina image of the user.

5. The method of claim 1, wherein the first visual biometric data comprises a first fingerprint image of the user, and wherein the second visual biometric data comprises a second fingerprint image of the user.

6. The method of claim 1, wherein the retrieving the second visual biometric data comprises accessing a distributed ledger that stores identifications of the plurality of distributed storage nodes storing the portions of the second visual biometric data.

7. The method of claim 6, further comprising:
storing the portions of the second visual biometric data in a different plurality of distributed storage nodes; and
recording identifications of the different plurality of distributed storage nodes in the distributed ledger.

8. The method of claim 6, wherein the processing system comprises one of a plurality of distributed verification nodes, wherein the plurality of distributed verification nodes comprises a plurality of blockchain nodes.

9. The method of claim 6, wherein the distributed ledger is associated with a blockchain that is dedicated to the requesting entity, wherein other requesting entities have respective dedicated blockchains for verifying identities of users.

10. The method of claim 1, further comprising:
detecting a security issue associated with the visual feed; and
ceasing the transmitting of the visual feed in response to the detecting the security issue.

11. The method of claim 10, wherein the processing system continues the transmitting of the visual feed on an ongoing basis until the ceasing the transmitting of the visual feed in response to the detecting the security issue.

12. The method of claim 10, wherein the security issue is detected via a notification to the processing system from the endpoint device of the user.

13. The method of claim 1, further comprising:
extracting third biometric data of the user from the visual feed;
retrieving fourth biometric data of the user from a different plurality of distributed storage nodes; and
determining a match between the third biometric data and the fourth biometric data.

14. The method of claim 13, wherein the transmitting the visual feed to the device of the requesting entity with the indication of the authentication of the user is further in response to the determining the match between the third biometric data and the fourth biometric data.

15. The method of claim 13, wherein the retrieving the fourth biometric data and the determining the match between the third biometric data and the fourth biometric data are performed via at least a second distributed verification node.

16. The method of claim 15, wherein the extracting the third biometric data of the user from the visual feed is performed via the at least the second distributed verification node.

17. The method of claim 1, wherein the visual feed comprises a holographic video.

18. A non-transitory computer-readable medium storing instructions which, when executed by a processing system including at least one processor, cause the processing system to perform operations, the operations comprising:
obtaining, from a device of a requesting entity, a request to verify an identity of a user in a visual feed;
obtaining the visual feed from an endpoint device associated with the user, the visual feed including first visual biometric data of the user, wherein the endpoint device associated with the user includes a trusted application for providing the visual feed and the trusted application is configured to close other applications and services on the endpoint device, wherein the other applications and services are not associated with transmitting of the visual feed;
extracting the first visual biometric data of the user from the visual feed;
retrieving second visual biometric data of the user from a plurality of distributed storage nodes, wherein each distributed storage node of the plurality of distributed storage nodes stores a portion of the second visual biometric data;
determining a match between the first visual biometric data and the second visual biometric data; and
transmitting the visual feed to the device of the requesting entity, wherein the visual feed comprises an indication of an authentication of the user, in response to the determining the match between the first visual biometric data and the second visual biometric data.

19. An apparatus comprising:
a processing system including at least one processor; and
a computer-readable medium storing instructions which, when executed by the processing system, cause the processing system to perform operations, the operations comprising:
- obtaining, from a device of a requesting entity, a request to verify an identity of a user in a visual feed;
- obtaining the visual feed from an endpoint device associated with the user, the visual feed including first visual biometric data of the user, wherein the endpoint device associated with the user includes a trusted application for providing the visual feed and the trusted application is configured to close other applications and services on the endpoint device, wherein the other applications and services are not associated with transmitting of the visual feed;
- extracting the first visual biometric data of the user from the visual feed;
- retrieving second visual biometric data of the user from a plurality of distributed storage nodes, wherein each distributed storage node of the plurality of distributed storage nodes stores a portion of the second visual biometric data;
- determining a match between the first visual biometric data and the second visual biometric data; and
- transmitting the visual feed to the device of the requesting entity, wherein the visual feed comprises an indication of an authentication of the user, in response to the determining the match between the first visual biometric data and the second visual biometric data.

20. The apparatus of claim 19, wherein the indication of the authentication of the user comprises a visual indicator, wherein the operations further comprise:
modifying the visual feed to include the visual indicator.

* * * * *